United States Patent
Weaver et al.

(10) Patent No.: US 9,909,403 B2
(45) Date of Patent: Mar. 6, 2018

(54) ADJUSTING SURFACTANT CONCENTRATIONS DURING HYRAULIC FRACTURING

(71) Applicant: Halliburton Energy Services, Inc., Houston, TX (US)

(72) Inventors: Jim D. Weaver, Duncan, OK (US); Michael A. McCabe, Ducan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/912,309

(22) PCT Filed: Sep. 20, 2013

(86) PCT No.: PCT/US2013/060811
§ 371 (c)(1),
(2) Date: Feb. 16, 2016

(87) PCT Pub. No.: WO2015/041664
PCT Pub. Date: Mar. 26, 2015

(65) Prior Publication Data
US 2016/0208591 A1    Jul. 21, 2016

(51) Int. Cl.
*E21B 43/26* (2006.01)
*C09K 8/60* (2006.01)
*C09K 8/68* (2006.01)
*C09K 8/80* (2006.01)
*E21B 43/267* (2006.01)

(52) U.S. Cl.
CPC ............. *E21B 43/26* (2013.01); *C09K 8/602* (2013.01); *C09K 8/68* (2013.01); *C09K 8/685* (2013.01); *C09K 8/80* (2013.01); *E21B 43/267* (2013.01)

(58) Field of Classification Search
None
See application file for complete search history.

(56) References Cited

U.S. PATENT DOCUMENTS

| | | | | |
|---|---|---|---|---|
| 4,617,995 A | * | 10/1986 | Lau | E21B 43/24 166/272.3 |
| 2008/0011475 A1 | * | 1/2008 | Berger | C09K 8/584 166/270.1 |
| 2009/0118143 A1 | * | 5/2009 | Hinkel | C09K 8/602 507/200 |
| 2010/0012331 A1 | * | 1/2010 | Larter | C09K 8/58 166/401 |
| 2010/0224365 A1 | * | 9/2010 | Abad | E21B 43/26 166/275 |
| 2011/0161010 A1 | * | 6/2011 | Rickman | E21B 43/16 702/11 |
| 2012/0055676 A1 | | 3/2012 | Wood | |
| 2012/0305247 A1 | | 12/2012 | Chen et al. | |
| 2012/0325472 A1 | | 12/2012 | Litvinets et al. | |
| 2013/0048282 A1 | | 2/2013 | Adams et al. | |
| 2013/0168095 A1 | | 7/2013 | Loveless et al. | |

OTHER PUBLICATIONS

International Preliminary Report on Patentability issued in related PCT Application No. PCT/US2013/060811 dated Mar. 31, 2016 (8 pages).
International Search Report and Written Opinion issued in related PCT Application No. PCT/US2013/060811 dated Jun. 20, 2014, 10 pages.

* cited by examiner

*Primary Examiner* — Angela M DiTrani
*Assistant Examiner* — Andrew Sue-Ako
(74) *Attorney, Agent, or Firm* — Craig Roddy; Baker Botts L.L.P.

(57) ABSTRACT

Fracturing methods include introducing a relatively high concentration of a surfactant in an initial portion of one or more fluids used in a fracturing treatment and then cutting or ramping back to a relatively low concentration of the surfactant in the remaining fluid used in the treatment. By using such a method, the volume of surfactant to provide superior treatment can be reduced significantly from the normal recommendations, leading to a high cost savings while still obtaining the desired effect upon cleanup.

17 Claims, No Drawings

ADJUSTING SURFACTANT CONCENTRATIONS DURING HYRAULIC FRACTURING

CROSS-REFERENCE TO RELATED APPLICATIONS

Not applicable.

TECHNICAL FIELD

The disclosure is in the field of producing crude oil or natural gas from subterranean formations. More specifically, the disclosure generally relates to methods of hydraulic fracturing in a well.

BACKGROUND

Surface-active materials (surfactants) are used in fracturing operations to promote well cleanup following the use of water-based fracturing fluids. These products are generally blends of surfactants in solvent systems that keep the surfactants stable in storage, but are easily pumped and diluted in frac fluids to become active. Performance of the surface-active materials is generally based on cost to provide reduction in interfacial tension and reduction in contact angle, both which facilitate the removal of water from a porous media (for example, a proppant packed fracture) with mixtures of gas or oil by preventing or breaking emulsion formation. These products are mostly marketed as commodity materials and are very price sensitive.

Prior technology calls for adding a minimum concentration of one or more surface-active materials (surfactants) to the one or more fluids used in fracturing of a treatment zone required to cause the desired effect on cleanup throughout the entire fracturing treatment. Large volume fracturing treatments can require large volume of surfactant-based products to promote well cleanup.

In low permeability fracturing such as shale fractures, there is little fluid lost to the formation so that nearly all the fluid goes to creating fractures. As fluid is injected into a fracture to extend the fracture, the leading front of the fracture will be greatly reduced in the concentration of surfactant that is in the fluid at that point owing to the fact that surfactants tend to adsorb to the fracture face. Therefore, the leading edge of the fracturing fluid contains an inadequate amount of surfactant to affect the desired surface energies. In addition, any fluid that does leak off into the formation will not contain sufficient surfactant. To combat this problem, higher surfactant concentrations are used than are actually required.

GENERAL DESCRIPTION OF EMBODIMENTS

A placement method is provided to optimize the use of surface-active materials (surfactants) in fracturing operations to promote well cleanup following the use of water-based fracturing fluids.

Since the fluid that is most important to provide surface activity additives is a first or first portion of a fluid exposed to a newly generated fracture, a surfactant concentration gradient is used during the fracturing treatment. The first fluid into a well can be, for example, a breakdown fluid or other pre-pad fluid. Typically, these are thin fluids (low viscosity) with little viscosity-increasing agent and are most likely to be lost to the formation, which is where the surfactant should be placed. In addition, this fluid continually moves toward the fracture tip, and the surfactant is continually removed by adsorptions as it does. By calculating the exposed surface area of the newly created fracture and determining how much surfactant will be lost though adsorption, then the real surfactant concentration needed for a particular fluid or portion of a fluid can be estimated.

In simple terms, the method can include, for example, introducing a relatively high concentration of a surfactant in an initial portion of one or more fluids used in a fracturing treatment, for example about 10% by volume of the total, and then cutting or ramping back to a relatively low concentration of the surfactant in the remaining fluid used in the treatment.

By using such a method, the volume of surfactant to provide superior treatment can be reduced significantly from the normal recommendations, leading to a high cost savings while still obtaining the desired effect upon cleanup.

In addition to this being a placement method, the process of calculating the optimum treatment profile will is disclosed. These calculations will utilize laboratory measurements of adsorption coefficients and frac simulation to create treatment optimization.

Previous methods merely increased the surfactant concentration to make up for depletion. This method uses less total volume of surfactant for a frac treatment and results in better performance.

In an embodiment, a method of fracturing a treatment zone of a subterranean formation penetrated by a well is provided, the method comprising: continuously introducing a fluid into the treatment zone, wherein the fluid is water-based, wherein the fluid comprises a surfactant, wherein the introducing of the fluid is at least at a sufficient rate and pressure to create or extend a fracture in the subterranean formation, and wherein the concentration of the surfactant in the fluid is decreased from a first concentration to a second concentration at least once during the time of introducing of the fluid into the treatment zone.

In another embodiment, a method of fracturing a treatment zone of a subterranean formation penetrated by a well is provided, the method comprising: (A) introducing a first fluid into the treatment zone, wherein the first fluid is water-based, and wherein the first fluid comprises a first concentration of a surfactant; and (B) introducing a second fluid into the treatment zone, wherein the second fluid is water-based, wherein the second fluid comprises a second concentration of the surfactant, wherein the second concentration of the surfactant in the second fluid is lower than the first concentration of the surfactant in the first fluid, and wherein the introducing of the second fluid is at least at a sufficient rate and pressure to create or extend a fracture in the subterranean formation. Optionally, one or more additional fluids can be used in the fracturing of the treatment zone.

Such fracturing methods can optionally include: (A) determining an adsorption coefficient for the surfactant on an exposed surface area of the subterranean formation; (B) simulating the method of fracturing to estimate a total exposed surface area for a newly created or newly-extended fracture in the subterranean formation during the introducing of the one or more fluids into the treatment zone; (C) calculating the concentration of the surfactant to be adsorbed from a leading portion of the fluid or successive fluids during the introducing of the one or more fluids into the treatment zone; whereby the first concentration and the second concentration can be selected to minimize the total amount of the surfactant during the introducing of the first fluid and during the introducing of the second fluid.

These and other embodiments of the disclosure will be apparent to one skilled in the art upon reading the following detailed description. While the disclosure is susceptible to various modifications and alternative forms, specific embodiments thereof will be described in detail and shown by way of example. It should be understood, however, that it is not intended to limit the disclosure to the particular forms disclosed.

DETAILED DESCRIPTION OF PRESENTLY PREFERRED EMBODIMENTS AND BEST MODE

Definitions and Usages

General Interpretation

The words or terms used herein have their plain, ordinary meaning in the field of this disclosure, except to the extent explicitly and clearly defined in this disclosure or unless the specific context otherwise requires a different meaning.

The words "comprising," "containing," "including," "having," and all grammatical variations thereof are intended to have an open, non-limiting meaning. For example, a composition comprising a component does not exclude it from having additional components, an apparatus comprising a part does not exclude it from having additional parts, and a method having a step does not exclude it having additional steps. When such terms are used, the compositions, apparatuses, and methods that "consist essentially of" or "consist of" the specified components, parts, and steps are specifically included and disclosed. As used herein, the words "consisting essentially of," and all grammatical variations thereof are intended to limit the scope of a claim to the specified materials or steps and those that do not materially affect the basic and novel characteristic(s) of the claimed invention.

The indefinite articles "a" or "an" mean one or more than one of the component, part, or step that the article introduces.

Each numerical value should be read once as modified by the term "about" (unless already expressly so modified), and then read again as not so modified, unless otherwise indicated in context.

Whenever a numerical range of degree or measurement with a lower limit and an upper limit is disclosed, any number and any range falling within the range is also intended to be specifically disclosed. For example, every range of values (in the form "from a to b," or "from about a to about b," or "from about a to b," "from approximately a to b," and any similar expressions, where "a" and "b" represent numerical values of degree or measurement) is to be understood to set forth every number and range encompassed within the broader range of values.

Terms such as "first," "second," "third," etc. may be assigned arbitrarily and are merely intended to differentiate between two or more components, parts, or steps that are otherwise similar or corresponding in nature, structure, function, or action. For example, the words "first" and "second" serve no other purpose and are not part of the name or description of the following name or descriptive terms. The mere use of the term "first" does not require that there be any "second" similar or corresponding component, part, or step. Similarly, the mere use of the word "second" does not require that there be any "first" or "third" similar or corresponding component, part, or step. Further, it is to be understood that the mere use of the term "first" does not require that the element or step be the very first in any sequence, but merely that it is at least one of the elements or steps. Similarly, the mere use of the terms "first" and "second" does not necessarily require any sequence. Accordingly, the mere use of such terms does not exclude intervening elements or steps between the "first" and "second" elements or steps, etc.

Oil and Gas Reservoirs

A "subterranean formation" is a body of rock that has sufficiently distinctive characteristics and is sufficiently continuous for geologists to describe, map, and name it.

A subterranean formation containing oil or gas may be located under land or under the seabed off shore. Oil and gas reservoirs are typically located in the range of a few hundred feet (shallow reservoirs) to a few tens of thousands of feet (ultra-deep reservoirs) below the surface of the land or seabed.

Wells

To produce oil or gas from a reservoir, a wellbore is drilled into a subterranean formation, which may be the reservoir or adjacent to the reservoir. Typically, a wellbore of a well must be drilled hundreds or thousands of feet into the earth to reach a hydrocarbon-bearing formation.

A "well" includes a wellhead and at least one wellbore from the wellhead penetrating the earth. The "wellhead" is the surface termination of a wellbore, which surface may be on land or on a seabed.

The "wellbore" refers to the drilled hole, including any cased or uncased portions of the well or any other tubulars in the well. A wellbore can have portions that are vertical, horizontal, or anything in between, and it can have portions that are straight, curved, or branched. As used herein, "uphole," "downhole," and similar terms are relative to the direction of the wellhead, regardless of whether a wellbore portion is vertical or horizontal.

As used herein, introducing "into a well" means introducing at least into and through the wellhead. According to various techniques known in the art, tubulars, equipment, tools, or fluids can be directed from the wellhead into any desired portion of the wellbore.

As used herein, the word "treatment" refers to any treatment for changing a condition of a portion of a wellbore or a subterranean formation adjacent a wellbore; however, the word "treatment" does not necessarily imply any particular treatment purpose. A treatment usually involves introducing a fluid for the treatment, in which case it may be referred to as a treatment fluid, into a well. As used herein, a "treatment fluid" is a fluid used in a treatment. The word "treatment" in the term "treatment fluid" does not necessarily imply any particular treatment or action by the fluid.

A "zone" refers to an interval of rock along a wellbore that is differentiated from uphole and downhole zones based on hydrocarbon content or other features, such as permeability, composition, perforations or other fluid communication with the wellbore, faults, or fractures. A "treatment zone" refers to a zone into which a fluid is directed to flow from the wellbore. As used herein, "into a treatment zone" means into and through the wellhead and, additionally, through the wellbore and into the treatment zone.

Fluid loss refers to the undesirable leakage of a fluid phase of any type of fluid into the permeable matrix of a zone, which zone may or may not be a treatment zone. Fluid-loss control refers to treatments designed to reduce such undesirable leakage.

A "design" refers to the estimate or measure of one or more parameters planned or expected for a particular fluid or stage of a well service or treatment. For example, a fluid can be designed to have components that provide a minimum density or viscosity for at least a specified time under expected downhole conditions. A well service may include design parameters such as fluid volume to be pumped, required pumping time for a treatment, or the shear conditions of the pumping.

The term "design temperature" refers to an estimate or measurement of the actual temperature at the downhole environment during the time of a treatment. For example, the design temperature for a well treatment takes into account not only the bottom hole static temperature ("BHST"), but also the effect of the temperature of the fluid on the BHST during treatment. The design temperature for a fluid is sometimes referred to as the bottom hole circulation temperature ("BHCT"). Because fluids may be considerably cooler than BHST, the difference between the two temperatures can be quite large. Ultimately, if left undisturbed a subterranean formation will return to the BHST.

Phases and Physical States

As used herein, "phase" is used to refer to a substance having a chemical composition and physical state that is distinguishable from an adjacent phase of a substance having a different chemical composition or a different physical state.

As used herein, if not other otherwise specifically stated, the physical state or phase of a substance (or mixture of substances) and other physical properties are determined at a temperature of 77° F. (25° C.) and a pressure of 1 atmosphere (Standard Laboratory Conditions) without applied shear.

Hydratability or Solubility

As referred to herein, "hydratable" means capable of being hydrated by contacting the hydratable material with water. Regarding a hydratable material that includes a polymer, this means, among other things, to associate sites on the polymer with water molecules and to unravel and extend the polymer chain in the water.

The term "solution" is intended to include not only true molecular solutions but also dispersions of a polymer wherein the polymer is so highly hydrated as to cause the dispersion to be visually clear and having essentially no particulate matter visible to the unaided eye. The term "soluble" is intended to have a meaning consistent with these meanings of solution.

A substance is considered to be "soluble" in a liquid if at least 10 grams of the substance can be hydrated or dissolved in one liter of the liquid when tested at 77° F. and 1 atmosphere pressure for 2 hours, considered to be "insoluble" if less than 1 gram per liter, and considered to be "sparingly soluble" for intermediate solubility values.

As will be appreciated by a person of skill in the art, the hydratability, dispersibility, or solubility of a substance in water can be dependent on the salinity, pH, or other substances in the water. Accordingly, the salinity, pH, and additive selection of the water can be modified to facilitate the hydratability, dispersibility, or solubility of a substance in aqueous solution. To the extent not specified, the hydratability, dispersibility, or solubility of a substance in water is determined in deionized water, at neutral pH, and without any other additives.

Fluids

A fluid can be a homogeneous or heterogeneous. In general, a fluid is an amorphous substance that is or has a continuous phase of particles that are smaller than about 1 micrometer that tends to flow and to conform to the outline of its container.

Every fluid inherently has at least a continuous phase. A fluid can have more than one phase. The continuous phase of a treatment fluid is a liquid under Standard Laboratory Conditions.

The term "water" is used generally herein to include fresh water or brine, unless the context otherwise requires.

As used herein, a "water-based" fluid means that water or an aqueous solution is the dominant material of the continuous phase, that is, greater than 50% by weight, of the continuous phase of the fluid based on the combined weight of water and any other solvents in the phase (that is, excluding the weight of any dissolved solids).

Viscosity is a measure of the resistance of a fluid to flow. In everyday terms, viscosity is "thickness" or "internal friction." Therefore, pure water is "thin," having a relatively low viscosity whereas honey is "thick," having a relatively higher viscosity. Put simply, the less viscous the fluid is, the greater its ease of movement (fluidity). More precisely, viscosity is defined as the ratio of shear stress to shear rate.

A substance is considered to be a fluid if it has an apparent viscosity less than 5,000 mPa·s (cP) (independent of any gel characteristic). For reference, the viscosity of pure water is about 1 mPa·s (cP).

Gels and Deformation

Technically, a "gel" is a semi-solid, jelly-like physical state or phase that can have properties ranging from soft and weak to hard and tough. Shearing stresses below a certain finite value fail to produce permanent deformation. The minimum shear stress which will produce permanent deformation is referred to as the shear strength or gel strength of the gel.

The physical state of a gel is formed by a network of interconnected molecules, such as a crosslinked polymer or a network of micelles in a continuous liquid phase. The network gives a gel phase its structure and an apparent yield point. At the molecular level, a gel is a dispersion in which both the network of molecules is continuous and the liquid is continuous. A gel is sometimes considered as a single phase.

In the oil and gas industry, however, the term "gel" may be used to refer to any fluid having a viscosity-increasing agent, regardless of whether it is a viscous fluid or meets the technical definition for the physical state of a gel. A "base gel" is a term used in the field for a fluid that includes a viscosity-increasing agent, such as guar or other polymer, but that excludes crosslinking agents. Typically, a base gel is mixed with another fluid containing a crosslinker, wherein the mixture is adapted to form a crosslinked gel. Similarly, a "crosslinked gel" may refer to a substance having a viscosity-increasing agent that is crosslinked, regardless of whether it is a viscous fluid or meets the technical definition for the physical state of a gel.

As used herein, a substance referred to as a "gel" is subsumed by the concept of "fluid" if it is a pumpable fluid.

Surfactants

In general, surfactants are compounds that lower the surface tension of a liquid, the interfacial tension between two liquids, or that between a liquid and a solid, or that between a liquid and a gas. Surfactants may act as detergents, wetting agents, emulsifiers, foaming agents, and dispersants.

Surfactants are usually organic compounds that are amphiphilic, meaning they contain both hydrophobic groups ("tails") and hydrophilic groups ("heads"). Therefore, a surfactant contains both a water-insoluble (or oil soluble) portion and a water-soluble portion.

A surfactant package can include one or more different chemicals and may be conveniently provided in a solvent or solvent mixture.

In various embodiments according to the disclosure, at least one surfactant is included in a treatment fluid that is selected for lowering the pressure required to inject the fluid into the formation.

In various embodiments, the surfactant is selected from the group consisting of cationic, non-ionic, and anionic surfactants.

Types of cationic surfactants that may be suitable for certain embodiments of the present disclosure include, but are not limited to, alkyl amines, alkyl amine salts, quaternary ammonium salts such as trimethyltallowammonium chloride, amine oxides, alkyltrimethyl amines, triethyl amines, alkyldimethylbenzylamines, alkylamidobetaines such as cocoamidopropyl betaine, alpha-olefin sulfonate, C8 to C22 alkylethoxylate sulfate, trimethylcocoammonium chloride, derivatives thereof, and combinations thereof.

Types of anionic surfactants that may be suitable for certain embodiments of the present disclosure include, but are not limited to, alkyl carboxylates, alkylether carboxylates, N-acylaminoacids, N-acylglutamates, N-acylpolypeptides, alkylbenzenesulfonates, paraffinic sulfonates, α-olefinsulfonates, lignosulfates, derivatives of sulfosuccinates, polynapthylmethylsulfonates, alkyl sulfates, alkylethersulfates, monoalkylphosphates, polyalkylphosphates, fatty acids, alkali salts of acids, alkali salts of fatty acids, alkaline salts of acids, sodium salts of acids, sodium salts of fatty acid, alkyl ethoxylate, soaps, derivatives thereof, and combinations thereof.

Types of non-ionic surfactants that may be suitable for certain embodiments of the present disclosure include, but are not limited to, alcohol oxylalkylates, alkyl phenol oxylalkylates, nonionic esters such as sorbitan esters alkoxylates of sorbitan esters, castor oil alkoxylates, fatty acid alkoxylates, lauryl alcohol alkoxylates, nonylphenol alkoxylates, octylphenol alkoxylates, and tridecyl alcohol alkoxylates. Examples of non-ionic surfactants that may be suitable include, but are not limited to, POE-10 nonylphenol ethoxylate, POE-100 nonylphenol ethoxylate, POE-12 nonylphenol ethoxylate, POE-12 octylphenol ethoxylate, POE-12 tridecyl alcohol ethoxylate, POE-14 nonylphenol ethoxylate, POE-15 nonylphenol ethoxylate, POE-18 tridecyl alcohol ethoxylate, POE-20 nonylphenol ethoxylate, POE-20 oleyl alcohol ethoxylate, POE-20 stearic acid ethoxylate, POE-3 tridecyl alcohol ethoxylate, POE-30 nonylphenol ethoxylate, POE-30 octylphenol ethoxylate, POE-34 nonylphenol ethoxylate, POE-4 nonylphenol ethoxylate, POE-40 castor oil ethoxylate, POE-40 nonylphenol ethoxylate, POE-40 octylphenol ethoxylate, POE-50 nonylphenol ethoxylate, POE-50 tridecyl alcohol ethoxylate, POE-6 nonylphenol ethoxylate, POE-6 tridecyl alcohol ethoxylate, POE-8 nonylphenol ethoxylate, POE-9 octylphenol ethoxylate, mannide monooleate, sorbitan isostearate, sorbitan laurate, sorbitan monoisostearate, sorbitan monolaurate, sorbitan monooleate, sorbitan monopalmitate, sorbitan monostearate, sorbitan oleate, sorbitan palmitate, sorbitan sesquioleate, sorbitan stearate, sorbitan trioleate, sorbitan tristearate, POE-20 sorbitan monoisostearate ethoxylate, POE-20 sorbitan monolaurate ethoxylate, POE-20 sorbitan monooleate ethoxylate, POE-20 sorbitan monopalmitate ethoxylate, POE-20 sorbitan monostearate ethoxylate, POE-20 sorbitan trioleate ethoxylate, POE-20 sorbitan tristearate ethoxylate, POE-30 sorbitan tetraoleate ethoxylate, POE-40 sorbitan tetraoleate ethoxylate, POE-6 sorbitan hexastearate ethoxylate, POE-6 sorbitan monstearate ethoxylate, POE-6 sorbitan tetraoleate ethoxylate, and/or POE-60 sorbitan tetrastearate ethoxylate.

In various embodiments, the surfactant is not a viscoelastic surfactant.

Hydraulic Fracturing

Hydraulic fracturing is a common stimulation treatment. The purpose of a hydraulic fracturing treatment is to provide an improved flow path for oil or gas to flow from the hydrocarbon-bearing formation to the wellbore. In addition, a fracturing treatment can facilitate the flow of injected treatment fluids from the well into the formation. A treatment fluid adapted for this purpose is sometimes referred to as a fracturing fluid. The fracturing fluid is pumped at a sufficiently high flow rate and pressure into the wellbore and into the subterranean formation to create or enhance one or more fractures in the subterranean formation. Creating a fracture means making a new fracture in the formation. Enhancing a fracture means enlarging a pre-existing fracture in the formation.

"Breakdown pressure" is the pressure at which the rock matrix of subterranean formation fractures and allows a fluid to be injected. Hydraulic fracturing operations are conducted above the breakdown pressure, whereas matrix stimulation treatments are performed below the breakdown pressure.

A "breakdown fluid" can be introduced ahead of a fracturing treatment fluid. A suitable surfactant can act as a penetrating aid for a treatment fluid by lowering the pressure required to inject the fluid into the formation. For example, this reduction in pressure is achieved by increased matrix penetration of the breakdown fluid containing the breakdown surfactant, which allows for transmission of energy from the wellbore to the formation rock. A breakdown fluid is typically introduced below breakdown pressure before initiating hydraulic fracture in the formation.

A "pad fluid" is a fluid used to initiate hydraulic fracturing that does not contain proppant.

The formation or extension of a fracture in hydraulic fracturing may initially occur suddenly. When this happens, the fracturing fluid suddenly has a fluid flow path through the fracture to flow more rapidly away from the wellbore. After initially breaking down the formation, the fracture may then propagate more slowly, at the same pressure or with little pressure increase.

As soon as the fracture is created or enhanced, the sudden increase in the flow of fluid away from the well reduces the pressure in the well. Thus, the creation or enhancement of a fracture in the formation may be indicated by a sudden drop in fluid pressure, which can be observed at the wellhead. It can also be detected with seismic techniques.

Proppant for Hydraulic Fracturing

A "fracture extending fluid" typically includes a proppant.

A newly-created or newly-extended fracture will tend to close together after the pumping of the fracturing fluid is stopped. To prevent the fracture from closing, a material is usually placed in the fracture to keep the fracture propped open and to provide higher fluid conductivity than the matrix of the formation. A material used for this purpose is referred to as a proppant.

A proppant is in the form of a solid particulate, which can be suspended in the fracturing fluid, carried downhole, and deposited in the fracture to form a proppant pack. The proppant pack props the fracture in an open condition while allowing fluid flow through the permeability of the pack. The proppant pack in the fracture provides a higher-permeability flow path for the oil or gas to reach the wellbore compared to the permeability of the matrix of the surrounding subterranean formation. This higher-permeability flow path increases oil and gas production from the subterranean formation.

A particulate for use as a proppant is usually selected based on the characteristics of size range, crush strength, and solid stability in the types of fluids that are encountered or used in wells. Preferably, a proppant should not melt, dissolve, or otherwise degrade from the solid state under the downhole conditions.

Increasing Viscosity of Fluid for Carrying Proppant

Increasing the viscosity of a fluid can help prevent a particulate having a different specific gravity than a surrounding phase of the fluid from quickly separating out of the fluid.

A viscosity-increasing agent can be used to increase the ability of a fluid to suspend and carry a particulate material in a fluid. A viscosity-increasing agent can be used for other purposes, such as matrix diversion, conformance control, or friction reduction. A viscosity-increasing agent is sometimes referred to in the art as a viscosifying agent, viscosifier, thickener, gelling agent, or suspending agent. In general, any of these refers to an agent that includes at least the characteristic of increasing the viscosity of a fluid in which it is dispersed or dissolved. There are several kinds of viscosity-increasing agents or techniques for increasing the viscosity of a fluid.

Certain kinds of polymers can be used to increase the viscosity of a fluid. In general, the purpose of using a polymer is to increase the ability of the fluid to suspend and carry a particulate material. Polymers for increasing the viscosity of a fluid are preferably soluble in the external phase of a fluid. Polymers for increasing the viscosity of a fluid can be naturally occurring polymers such as polysaccharides, derivatives of naturally occurring polymers, or synthetic polymers.

Treatment fluids used in high volumes, such as fracturing fluids, are usually water-based. Efficient and inexpensive viscosity-increasing agents for water include certain classes of water-soluble polymers.

The water-soluble polymer can have an average molecular weight in the range of from about 50,000 to 20,000,000, most preferably from about 100,000 to about 4,000,000. For example, guar polymer is believed to have a molecular weight in the range of about 2 to about 4 million.

Typical water-soluble polymers used in well treatments include water-soluble polysaccharides and water-soluble synthetic polymers (for example, polyacrylamide). The most common water-soluble polysaccharides employed in well treatments are guar and its derivatives.

A polymer can be classified as being single chain or multi chain, based on its solution structure in aqueous liquid media. Examples of single-chain polysaccharides that are commonly used in the oilfield industry include guar, guar derivatives, and cellulose derivatives. Guar polymer, which is derived from the beans of a guar plant, is referred to chemically as a galactomannan gum. Examples of multi-chain polysaccharides include xanthan, diutan, and scleroglucan, and derivatives of any of these.

Crosslinking of Polymer to Increase Viscosity of a Fluid or Form a Gel

The viscosity of a fluid at a given concentration of viscosity-increasing agent can be greatly increased by cross-linking the viscosity-increasing agent. A crosslinking agent, sometimes referred to as a crosslinker, can be used for this purpose. A crosslinker interacts with at least two polymer molecules to form a "crosslink" between them.

If crosslinked to a sufficient extent, the polysaccharide may form a gel with water. Gel formation is based on a number of factors including the particular polymer and concentration thereof, the particular crosslinker and concentration thereof, the degree of crosslinking, temperature, and a variety of other factors known to those of ordinary skill in the art.

For example, one of the most common viscosity-increasing agents used in the oil and gas industry is guar. A mixture of guar dissolved in water forms a base gel, and a suitable crosslinking agent can be added to form a much more viscous fluid, which is then called a crosslinked fluid. When a base gel is crosslinked, the viscosity is increased by 2 to 100 times depending on the temperature, the type of viscosity testing equipment and method, and the type of crosslinker used.

For a polymeric viscosity-increasing agent, any crosslinking agent that is suitable for crosslinking the chosen monomers or polymers may be used.

Cross-linking agents typically comprise at least one metal ion that is capable of cross-linking the viscosity-increasing agent molecules.

Some crosslinking agents form substantially permanent crosslinks with viscosity-increasing polymer molecules. Such crosslinking agents include, for example, crosslinking agents of at least one metal ion that is capable of crosslinking gelling agent polymer molecules. Examples of such crosslinking agents include, but are not limited to, zirconium compounds (such as, for example, zirconium lactate, zirconium lactate triethanolamine, zirconium carbonate, zirconium acetylacetonate, zirconium maleate, zirconium citrate, zirconium oxychloride, and zirconium diisopropylamine lactate); titanium compounds (such as, for example, titanium lactate, titanium maleate, titanium citrate, titanium ammonium lactate, titanium triethanolamine, and titanium acetylacetonate); aluminum compounds (such as, for example, aluminum acetate, aluminum lactate, or aluminum citrate); antimony compounds; chromium compounds; iron compounds (such as, for example, iron chloride); copper compounds; zinc compounds; sodium aluminate; or a combination thereof.

Some crosslinking agents do not form substantially permanent crosslinks, but rather chemically labile crosslinks with viscosity-increasing polymer molecules. For example, a guar-based gelling agent that has been crosslinked with a borate-based crosslinking agent does not form permanent cross-links.

Where present, the cross-linking agent generally should be included in the fluids in an amount sufficient, among other things, to provide the desired degree of cross linking. In some embodiments, the cross-linking agent may be present in the treatment fluids in an amount in the range of from about 0.01% to about 5% by weight of the treatment fluid.

Buffering compounds may be used if desired, for example, to delay or control the cross linking reaction. These may include glycolic acid, carbonates, bicarbonates, acetates, phosphates, and any other suitable buffering agent.

Viscoelastic Surfactants for Increasing Viscosity

It should be understood that merely increasing the viscosity of a fluid may only slow the settling or separation of distinct phases and does not necessarily stabilize the suspension of any particles in the fluid.

Certain viscosity-increasing agents can also increase the elastic modulus of the fluid. The elastic modulus is the measure of a substance's tendency to be deformed non-permanently when a force is applied to it. The elastic modulus of a fluid, commonly referred to as G', is a mathematical expression and defined as the slope of a stress versus strain curve in the elastic deformation region. G' is expressed in units of pressure, for example, Pa (Pascals) or dynes/cm$^2$. As a point of reference, the elastic modulus of water is negligible and considered to be zero.

An example of a viscosity-increasing agent that is also capable of increasing the suspending capacity of a fluid is to use a viscoelastic surfactant. As used herein, the term "viscoelastic surfactant" or "VES" refers to a surfactant that imparts or is capable of imparting viscoelastic behavior to a fluid due, at least in part, to the three-dimensional association of surfactant molecules to form viscosifying micelles. When the concentration of the viscoelastic surfactant in a viscoelastic fluid significantly exceeds a critical concentration, and in most cases in the presence of an electrolyte, surfactant molecules aggregate into species such as micelles, which can interact to form a network exhibiting elastic behavior.

As used herein, the term "micelle" is defined to include any structure that minimizes the contact between the lyophobic ("solvent-repelling") portion of a surfactant molecule and the solvent, for example, by aggregating the surfactant molecules into structures such as spheres, cylinders, or sheets, wherein the lyophobic portions are on the interior of the aggregate structure and the lyophilic ("solvent-attracting") portions are on the exterior of the structure.

As used herein, the term "surfactant gel" or "VES fluid" refers to a fluid that exhibits or is capable of exhibiting viscoelastic behavior due, at least in part, to the association of a VES contained therein that forms viscosifying micelles.

Slick-Water Fracturing of Shale Formations

An example of a well treatment that may utilize a friction-reducing polymer is commonly referred to as "high-rate water fracturing" or "slick-water fracturing," which is commonly used for fracturing of ultra-low permeable formations such as shale formations.

Ultra-low permeable formations tend to have a naturally occurring network of multiple interconnected micro-sized fractures. The fracture complexity is sometimes referred to in the art as a fracture network. Ultra-low permeable formations can be fractured to create or increase such multiple interconnected micro-sized fractures. This approach can be used to help produce gas from such an ultra-low permeable formation. According to current technology, a shale formation suitable for economic recovery as a gas reservoir is characterized by having a hydrocarbon content greater than 2% by volume gas filled porosity.

Ultra-low permeable formations are usually fractured with water-based fluids having little viscosity and that are used to suspend relatively low concentrations of proppant. The size of the proppant is sized to be appropriate for the fracture complexity of such a formation, which is much smaller than used for fracturing higher permeability formations such as sandstone or even tight gas reservoirs. The overall purpose is to increase or enhance the fracture complexity of such a formation to allow the gas to be produced. Although the fractures of the fracture network are very small compared to fractures formed in higher permeability formations, they should still be propped open.

Stimulated rock volume is a term used in the art regarding the fracturing of shale or other ultra-low permeability reservoirs. "Ultra-low permeability shale reservoirs require a large fracture network to maximize well performance. Microseismic fracture mapping has shown that large fracture networks can be generated in many shale reservoirs. In conventional reservoirs and tight gas sands, single-plane fracture half-length and conductivity are the key drivers for stimulation performance. In shale reservoirs, where complex network structures in multiple planes are created, the concept of a single fracture half-length and conductivity are insufficient to describe stimulation performance. This is the reason for the concept of using stimulated reservoir volume as a correlation parameter for well performance. The size of the created fracture network can be approximated as the 3-D volume (Stimulated Reservoir Volume or SRV) of the microseismic event cloud." M. J. Mayerhofer, E. P. Lolon, N. R. Warpinski, C. L. Cipolla, and D. Walser, Pinnacle Technologies, and C. M. Rightmire, Forrest A. Garb and Associates; Society of Petroleum Engineers, "SPE Shale Gas Production Conference, 16-18 Nov. 2008, Fort Worth, Tex., USA," "What is Stimulated Rock Volume?" SPE 119890.

The fracturing fluids for use in fracturing ultra-low permeability formations are water-based. One of the reasons for this is the large volumes required, and water is relatively low cost compared to oil-based fluids. Other reasons can include concern for damaging the reservoir and environmental concerns.

Generally, the treatment fluids in slick-water fracturing not relying on viscosity for proppant transport. Where particulates (for example, proppant, etc.) are included in the fracturing fluids, the fluids rely on at least velocity to transport the particulates to the desired location in the formation. Preferably, a friction-reducing polymer is used in an amount that is sufficient to provide the desired friction reduction without appreciably viscosifying the fluid and usually without a crosslinker. As a result, the fracturing fluids used in these high-rate water-fracturing operations generally have a lower viscosity than conventional fracturing fluids for conventional formations.

Damage to Permeability

In well treatments using viscous fluids, the material for increasing the viscosity of the fluid can damage the permeability of the proppant pack or the matrix of the subterranean formation. For example, a treatment fluid can include a polymeric material that is deposited in the fracture or within the matrix. By way of another example, the fluid may include surfactants that leave unbroken micelles in the fracture, lead to slug formation, or change the wettability of the formation in the region of the fracture.

The term "damage" as used herein regarding a formation refers to undesirable deposits in a subterranean formation that may reduce its permeability. Scale, skin, gel residue, and hydrates are contemplated by this term.

After application of a treatment that may cause damage or form a filtercake, it is desirable to restore permeability into the formation. If the formation permeability of the desired producing zone is not restored, production levels from the formation can be significantly lower. Any filtercake or any solid or polymer filtration into the matrix of the zone resulting from a fluid treatment should be removed to restore the formation's permeability, preferably to at least its original level. This is often referred to as clean up.

Breaking Viscosity of a Fluid

In the case of hydraulic fracturing, the fluid should be removed leaving the proppant in the fracture and without damaging the formation or the conductivity of the proppant bed. To accomplish this removal, the viscosity of the treatment fluid must be reduced to a very low viscosity, preferably near the viscosity of water, for optimal removal from the propped fracture. Similarly, when a viscosified fluid is used for gravel packing, the viscosified fluid must be removed from the gravel pack.

Reducing the viscosity of a viscosified treatment fluid is referred to as "breaking" the fluid. Chemicals used to reduce the viscosity of treatment fluids are called breakers.

Breakers for reducing viscosity must be selected to meet the needs of each situation. First, it is important to understand the general performance criteria for breaking. In reducing the viscosity of the treatment fluid to a near water-thin state, the breaker must maintain a critical balance. Premature reduction of viscosity during the pumping of a treatment fluid can jeopardize the treatment. Inadequate reduction of fluid viscosity after pumping can also reduce production if the required conductivity is not obtained. A breaker should be selected based on its performance in the temperature, pH, time, and desired viscosity profile for each specific treatment.

In fracturing, for example, the ideal viscosity versus time profile would be if a fluid maintained 100% viscosity until the fracture closed on proppant and then immediately broke to a thin fluid. Some breaking inherently occurs during the 0.5 to 4 hours required to pump most fracturing treatments. One guideline for selecting an acceptable breaker design is that at least 50% of the fluid viscosity should be maintained at the end of the pumping time. This guideline may be adjusted according to job time, desired fracture length, and required fluid No particular mechanism is necessarily implied by breaking or breaker regarding the viscosity of a fluid.

For example, for use a fluid viscosified with a polymeric material as the viscosity-increasing agent, a breaker can operate by cleaving the backbone of polymer by hydrolysis of acetyl group, cleavage of glycosidic bonds, oxidative/reductive cleavage, free radical breakage, or a combination of these processes. Accordingly, such a breaker can reduce the molecular weight of the polymer by cutting the long polymer chain. As the length of the polymer chain is cut, the viscosity of the fluid is reduced.

In another example, a breaker may reverse a crosslinking of a viscosity-increasing agent or attack the crosslinker.

For breaking a viscoelastic fluid formed with a viscoelastic surfactant as the viscosity-increasing agent, there are two principal methods of breaking: dilution of the fluid with another fluid, such as a formation fluid, and chemical breakers, such as acids.

Dilution with formation fluids is an unreliable method. For example, in oilfield applications, the viscosity of viscoelastic surfactant gels may be reduced or lost upon exposure to formation fluids (for example, crude oil, condensate or water); and this viscosity reduction or loss effectuates cleanup of the reservoir, fracture, or other treated area. In some circumstances, it is desirable to have a better control of that breaking, for instance, when breaking of the fluid is desired at a particular time or condition, when it is desired to accelerate viscosity reduction, or when the natural influx of reservoir fluids (for example, in dry gas reservoirs) does not break or breaks incompletely the viscoelastic surfactant gel.

In some cases, chemical breaking of a surfactant gel can be more reliable. Various types of alcohols, organic acids, enzymes, transition metals (for example, iron), and salts are known to impart a reduction of the viscosity of a viscoelastic gel or even to completely "break" a surfactant gel.

As used herein, to "break," in regard to an emulsion, means to cause the creaming and coalescence of emulsified drops of the internal dispersed phase so that the internal phase separates out of the external phase. For example, breaking an emulsion can be accomplished mechanically (for example, in settlers, cyclones, or centrifuges), or via dilution, or with chemical additives to increase the surface tension of the internal droplets.

Chemical breakers used to help clean up a filtercake or break the viscosity of a viscosified fluid are generally grouped into several classes: oxidizers, enzymes, chelating agents, and acids.

Adjusting Surfactant Concentration for at Least One Fluid in a Fracturing Treatment According to this disclosure, a method of fracturing a treatment zone of a subterranean formation penetrated by a well is provided, the method comprising: introducing a fluid into the treatment zone, wherein the fluid is water-based, wherein the fluid comprises a surfactant, wherein the introducing of the fluid is at least at a sufficient rate and pressure to create or extend a fracture in the subterranean formation, and wherein the concentration of the surfactant in the fluid is decreased from a first concentration to a second concentration at least once during the time of introducing of the fluid into the treatment zone.

In various embodiments, the concentration of the surfactant is decreased in one or more steps over at least a portion of the time of introducing of the fluid into the treatment zone.

In various embodiments, the concentration of the surfactant is decreased from a first concentration to a second concentration continuously over at least a portion of the time of introducing of the fluid into the treatment zone.

In various embodiments, the concentration of the surfactant is decreased at a variable rate over at least a portion of the time of introducing of the fluid into the treatment zone.

In various embodiments, such methods can additionally comprise: (A) determining an adsorption coefficient for the surfactant on an exposed surface area of the subterranean formation; (B) simulating the method of fracturing to estimate a total exposed surface area for a newly created or newly-extended fracture in the subterranean formation during the introducing of the fluid into the treatment zone; (C) calculating the concentration of the surfactant to be adsorbed from the first portion of the fluid during the introducing of the fluid into the treatment zone; and (D) calculating the concentration of the surfactant to be adsorbed from the second portion of the fluid during the introducing of the fluid into the treatment zone; whereby the first concentration and the second concentration can be selected to minimize the total amount of the surfactant during the introducing of the fluid.

Shale Formation

In various embodiments of the fracturing treatment according to the disclosure, the subterranean formation is a shale formation.

Composition of the Fluid

In various embodiments, the fluid additionally comprises: a polymeric viscosity-increasing agent, wherein the polymeric viscosity-increasing agent is water-soluble or water-hydratable.

In various embodiments, the fluid additionally comprises: a crosslinker for the polymeric viscosity-increasing agent.

In various embodiments, the fluid additionally comprises: a breaker for the crosslinking of the polymeric viscosity-increasing agent. In various embodiments, the fluid additionally comprises: a breaker for the polymeric viscosity-increasing agent.

In various embodiments, the first fluid additionally comprises: a first proppant.

Adjusting Surfactant Concentration for Two or More Fluids in a Fracturing Treatment According to an embodiment of this disclosure, a method of fracturing a treatment zone of a subterranean formation penetrated by a well is provided, the method comprising: (A) introducing a first fluid into the treatment zone, wherein the first fluid is water-based, and wherein the first fluid comprises a first concentration of a surfactant; and (B) introducing a second fluid into the treatment zone, wherein the second fluid is water-based, wherein the second fluid comprises a second concentration of the surfactant, wherein the second concentration of the surfactant in the second fluid is lower than the first concentration of the surfactant in the first fluid, and wherein the introducing of the second fluid is at least at a sufficient rate and pressure to create or extend a fracture in the subterranean formation.

Calculating Minimum First and Second Surfactant Concentrations

In various embodiments, the methods using two or more treatment fluid can additionally comprise: (A) determining an adsorption coefficient for the surfactant on an exposed surface area of the subterranean formation; (B) simulating the method of fracturing to estimate a total exposed surface area for a newly created or newly-extended fracture in the subterranean formation during the introducing of the first fluid and the introducing of the second fluid into the treatment zone; (C) calculating the concentration of the surfactant to be adsorbed from the first fluid during the introducing of the first fluid into the treatment zone; and (D) calculating the concentration of the surfactant to be adsorbed from the second fluid during the introducing of the second fluid into the treatment zone; whereby the first concentration and the second concentration can be selected to minimize the total amount of the surfactant during the introducing of the first fluid and during the introducing of the second fluid.

Introducing the Second Fluid Immediately after Introducing the First Fluid

In various embodiments, the introducing of the second fluid is immediately after the first fluid. This means without interruption and without introducing any other fluid between the introducing of the first fluid and the introducing of the second fluid.

Introducing the First Fluid Below or Above Fracture Pressure

In various embodiments, the introducing of the first fluid is below a sufficient rate and pressure to create or extend a fracture in the subterranean formation. In various embodiments, such a fluid can be, for example, a breakdown fluid or other pre-pad fluid.

In various embodiments, the introducing of the first fluid is at least at a sufficient rate and pressure to create or extend a fracture in the subterranean formation. In various embodiments, the first fluid can be, for example, a pad fluid.

Composition of the First Fluid

In various embodiments, the first fluid additionally comprises: a first polymeric viscosity-increasing agent, wherein the first polymeric viscosity-increasing agent is water-soluble or water-hydratable.

In various embodiments, the first fluid additionally comprises: a first crosslinker for the first polymeric viscosity-increasing agent.

In various embodiments, the first fluid additionally comprises: a first breaker for the crosslinking of the first polymeric viscosity-increasing agent.

In various embodiments, the first fluid additionally comprises: a first breaker for the first polymeric viscosity-increasing agent.

In various embodiments, the first fluid additionally comprises: a first proppant.

Composition of the Second Fluid

In various embodiments, the second fluid additionally comprises: a second polymeric viscosity-increasing agent, wherein the second polymeric viscosity-increasing agent is water-soluble or water-hydratable.

In various embodiments, the second fluid additionally comprises: a second crosslinker for the second polymeric viscosity-increasing agent.

In various embodiments, the second fluid additionally comprises: a second breaker for the crosslinking of the second polymeric viscosity-increasing agent.

In various embodiments, the second fluid additionally comprises: a second breaker for the second polymeric viscosity-increasing agent.

In various embodiments, the second fluid additionally comprises: a second proppant.

In various embodiments, the second fluid is essentially the same as the first fluid except for the concentration of the surfactant.

Introducing a Third Fluid

In various embodiments, a multiple-fluid method additionally comprise: introducing a third fluid, wherein the third fluid is water-based, and wherein the third fluid comprises a third concentration of the surfactant, wherein the third concentration of the surfactant in the third fluid is lower than the second concentration of the surfactant in the second fluid, and wherein the introducing of the third fluid is at least at a sufficient rate and pressure to create or extend a fracture in the subterranean formation.

Calculating Minimum First, Second, and Third Surfactant Concentrations

In various embodiments, the methods including three or more fluids can additionally comprise: (A) determining an adsorption coefficient for the surfactant on an exposed surface area of the subterranean formation; (B) simulating the method of fracturing to estimate a total exposed surface area for a newly created or newly-extended fracture in the subterranean formation during the introducing of the first fluid, the introducing of the second fluid, and the introducing of the third fluid into the treatment zone; (C) calculating the concentration of the surfactant to be adsorbed from the first fluid during the introducing of the first fluid into the treatment zone; (D) calculating the concentration of the surfactant to be adsorbed from the second fluid during the introducing of the second fluid into the treatment zone; and (E) calculating the concentration of the surfactant to be adsorbed from the third fluid during the introducing of the third fluid into the treatment zone; whereby the first concentration and the second concentration can be selected to minimize the total amount of the surfactant during the introducing of the first fluid and during the introducing of the second fluid.

Introducing of the Third Fluid Immediately after Introducing of the Second Fluid In various embodiments, the introducing of the second fluid is immediately after the first fluid.

Composition of the Third Fluid

It is to be understood that additional fluids may be used in a fracturing treatment of a treatment zone. For example, a third fluid may be employed.

In various embodiments, the third fluid additionally comprises: a third polymeric viscosity-increasing agent, wherein the third polymeric viscosity-increasing agent is water-soluble or water-hydratable.

In various embodiments, the third fluid additionally comprises: a third crosslinker for the polymeric viscosity-increasing agent.

In various embodiments, the third fluid additionally comprises: a third breaker for the cros slinking of the third polymeric viscosity-increasing agent.

In various embodiments, the second fluid additionally comprises: a third breaker for the second polymeric viscosity-increasing agent.

In various embodiments, the third fluid additionally comprises: a third proppant.

In various embodiments, the third fluid is essentially the same as the second fluid except for the concentration of the surfactant.

Other Fluid Additives

A fluid can contain additives that are commonly used in oil field applications, as known to those skilled in the art. These include, but are not necessarily limited to, brines, inorganic water-soluble salts, salt substitutes (such as trimethyl or tetramethyl ammonium chloride), pH control additives, defoamers, breakers, breaker aids, oxygen scavengers, alcohols, scale inhibitors, corrosion inhibitors, hydrate inhibitors, fluid-loss control additives, oxidizers, chelating agents, water-control agents (such as relative permeability modifiers), consolidating agents, proppant flowback control agents, conductivity enhancing agents, clay stabilizers, sulfide scavengers, fibers, nanoparticles, bactericides, and any combinations thereof.

Of course, other additives should be selected for not interfering with the purpose of the fluid.

Method of Treating a Well with the Fluid

According to the disclosure, methods of treating a well are provided, the methods including the steps of: forming one or more treatment fluids according to the disclosure; and introducing the one or more treatment fluids into the treatment zone.

Designing a Fracturing Treatment for a Treatment Zone

Designing a fracturing treatment usually includes determining a designed total pumping time for the treatment of the treatment zone or determining a designed total pumping volume of fracturing fluid for the treatment zone. The tail end of a fracturing treatment is the last portion of pumping time into the zone or the last portion of the volume of fracturing fluid pumped into the zone. This is usually about the last minute of total pumping time or about the last wellbore volume of a fracturing fluid to be pumped into the zone. The portion of pumping time or fracturing fluid volume that is pumped before the tail end of a fracturing stage reaches into a far-field region of the zone.

A person of skill in the art is able to plan each fracturing treatment in detail, subject to unexpected or undesired early screenout or other problems that might be encountered in fracturing a well. A person of skill in the art is able to determine the wellbore volume between the wellhead and the zone. In addition, a person of skill in the art is able to determine the time within a few seconds in which a fluid pumped into a well should take to reach a zone.

In addition to being designed in advance, the actual point at which a fracturing fluid is diverted from a zone can be determined by a person of skill in the art, including based on observed changes in well pressures or flow rates.

Fracturing methods can include a step of designing or determining a fracturing treatment for a treatment zone of the subterranean formation prior to performing the fracturing stage. For example, a step of designing can include: (a) determining the design temperature and design pressure; (b) determining the total designed pumping volume of the one or more fracturing fluids to be pumped into the treatment zone at a rate and pressure above the fracture pressure of the treatment zone; (c) designing a fracturing fluid, including its composition and rheological characteristics; (d) designing the pH of the continuous phase of the fracturing fluid, if water-based; (e) determining the size of a proppant of a proppant pack previously formed or to be formed in fractures in the treatment zone; and (f) designing the loading of any proppant in the fracturing fluid.

Forming Fluid

A fluid can be prepared at the job site, prepared at a plant or facility prior to use, or certain components of the fluid can be pre-mixed prior to use and then transported to the job site. Certain components of the fluid may be provided as a "dry mix" to be combined with fluid or other components prior to or during introducing the fluid into the well.

In various embodiments, the preparation of a fluid can be done at the job site in a method characterized as being performed "on the fly." The term "on-the-fly" is used herein to include methods of combining two or more components wherein a flowing stream of one element is continuously introduced into flowing stream of another component so that the streams are combined and mixed while continuing to flow as a single stream as part of the on-going treatment. Such mixing can also be described as "real-time" mixing.

Introducing into Well or Zone

Often the step of delivering a fluid into a well is within a relatively short period after forming the fluid, for example, less within 30 minutes to one hour. More preferably, the step of delivering the fluid is immediately after the step of forming the fluid, which is "on the fly."

It should be understood that the step of delivering a fluid into a well can advantageously include the use of one or more fluid pumps.

Introducing Below or Above Fracture Pressure

In various embodiments, a step of introducing a fluid, such as a breakdown fluid or other pre-pad fluid can be at a rate and pressure below the fracture pressure of the treatment zone.

In various embodiments, at least one step of introducing a fluid for a fracturing treatment of a zone comprises introducing under conditions for fracturing the treatment zone. The fluid is introduced into the treatment zone at a rate and pressure that are at least sufficient to create or extend at least one fracture the zone.

Allowing Time for Breaking in the Well

After the step of introducing a fracturing fluid, time can be allowed for breaking of the fluid in the well. This preferably occurs with time under the conditions in the zone of the subterranean fluid.

Flow Back Conditions

In various embodiments, the step of flowing back is within 24 hours of the step of introducing. In another embodiment, the step of flowing back is within 16 hours of the step of introducing.

Producing Hydrocarbon from Subterranean Formation

Preferably, after any such use of a fluid according to the disclosure, a step of producing hydrocarbon from the well or a particular zone is the desirable objective.

CONCLUSION

Therefore, the present disclosure is well adapted to attain the ends and advantages mentioned as well as those that are inherent therein.

The exemplary fluids disclosed herein may directly or indirectly affect one or more components or pieces of equipment associated with the preparation, delivery, recapture, recycling, reuse, or disposal of the disclosed fluids. For example, the disclosed fluids may directly or indirectly affect one or more mixers, related mixing equipment, mud pits, storage facilities or units, fluid separators, heat exchangers, sensors, gauges, pumps, compressors, and the like used generate, store, monitor, regulate, or recondition the exemplary fluids. The disclosed fluids may also directly or indirectly affect any transport or delivery equipment used to convey the fluids to a well site or downhole such as, for example, any transport vessels, conduits, pipelines, trucks, tubulars, or pipes used to fluidically move the fluids from one location to another, any pumps, compressors, or motors (for example, topside or downhole) used to drive the fluids into motion, any valves or related joints used to regulate the pressure or flow rate of the fluids, and any sensors (i.e., pressure and temperature), gauges, or combinations thereof, and the like. The disclosed fluids may also directly or indirectly affect the various downhole equipment and tools that may come into contact with the chemicals/fluids such as, but not limited to, drill string, coiled tubing, drill pipe, drill collars, mud motors, downhole motors or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

The particular embodiments disclosed above are illustrative only, as the present disclosure may be modified and practiced in different but equivalent manners apparent to those skilled in the art having the benefit of the teachings herein. It is, therefore, evident that the particular illustrative embodiments disclosed above may be altered or modified and all such variations are considered within the scope of the present disclosure.

The various elements or steps according to the disclosed elements or steps can be combined advantageously or practiced together in various combinations or sub-combinations of elements or sequences of steps to increase the efficiency and benefits that can be obtained from the disclosure.

It will be appreciated that one or more of the above embodiments may be combined with one or more of the other embodiments, unless explicitly stated otherwise.

The illustrative disclosure can be practiced in the absence of any element or step that is not specifically disclosed or claimed.

Furthermore, no limitations are intended to the details of construction, composition, design, or steps herein shown, other than as described in the claims.

What is claimed is:

1. A method of fracturing a treatment zone of a subterranean formation penetrated by a well, the method comprising:
    (A) determining an adsorption coefficient for a surfactant on an exposed surface area in the treatment zone;
    (B) simulating fracturing of the treatment zone to estimate a total exposed surface area for a fracture in the treatment zone;
    (C) calculating a first amount of the surfactant to be adsorbed into the treatment zone;
    (D) continuously introducing a water-based fluid comprising the surfactant at a first surfactant concentration into the treatment zone during a fluid introduction time period at a sufficient rate and pressure to create or extend a fracture in the subterranean formation; and
    (E) once the first amount of the surfactant has been introduced into the treatment zone, decreasing the concentration of the surfactant in the fluid from the first surfactant concentration to a second surfactant concentration while continuously introducing the fluid into the treatment zone during the fluid introduction time period.

2. The method according to claim 1, wherein the concentration of the surfactant is decreased from the first surfactant concentration to the second surfactant concentration continuously over at least a portion of the fluid introduction time period.

3. The method according to claim 1, wherein the concentration of the surfactant is decreased from the first surfactant concentration to the second surfactant concentration at a variable rate over at least a portion of the fluid introduction time period.

4. The method according to claim 1, wherein the first surfactant concentration and the second surfactant concentration are selected to minimize the total amount of the surfactant introduced into the treatment zone.

5. The method according to claim 1, wherein the fluid additionally comprises: a polymeric viscosity-increasing agent, wherein the polymeric viscosity-increasing agent is water-soluble or water-hydratable.

6. The method according to claim 5, wherein the fluid additionally comprises: a crosslinker for the polymeric viscosity-increasing agent.

7. The method according to claim 1, wherein the fluid additionally comprises: a proppant.

8. A method of fracturing a treatment zone of a subterranean formation penetrated by a well, the method comprising:
    (A) determining an adsorption coefficient for a surfactant on an exposed surface area in the treatment zone;
    (B) simulating fracturing of the treatment zone to estimate a total exposed surface area for a fracture in the treatment zone;
    (C) calculating a first amount of the surfactant to be adsorbed into the treatment zone;
    (D) introducing a first water-based fluid comprising a first concentration of the surfactant into the treatment zone for a first fluid introduction time period,
    at least the first amount of the surfactant to be adsorbed into the treatment zone is introduced into the treatment zone during the first fluid introduction time period; and
    (E) immediately after the first fluid introduction time period, introducing a second water-based fluid comprising a second concentration of the surfactant into the treatment zone at a sufficient rate and pressure to create or extend a fracture in the subterranean formation,
    wherein the second concentration of the surfactant in the second fluid is lower than the first concentration of the surfactant in the first fluid.

9. The method according to claim 8, wherein the first concentration and the second concentration are selected to minimize the total amount of the surfactant introduced into the treatment zone.

10. The method according to claim 8, wherein the introducing of the first fluid is below a sufficient rate and pressure to create or extend a fracture in the subterranean formation.

11. The method according to claim 8, wherein the introducing of the first fluid is at least at a sufficient rate and pressure to create or extend a fracture in the subterranean formation.

12. The method according to claim 8, wherein the first fluid or the second fluid additionally comprises: a polymeric viscosity-increasing agent, wherein the polymeric viscosity-increasing agent is water-soluble or water-hydratable.

13. The method according to claim 8, wherein the first fluid or the second fluid additionally comprises: a proppant.

14. The method according to claim 8, wherein the second fluid is essentially the same as the first fluid except for the concentration of the surfactant.

15. The method according to claim 8, additionally comprising:
   introducing a third water-based fluid comprising a third concentration of the surfactant into the treatment zone,
      wherein the third concentration of the surfactant in the third fluid is lower than the second concentration of the surfactant in the second fluid, and
      wherein the introducing of the third fluid is at least at a sufficient rate and pressure to create or extend a fracture in the subterranean formation.

16. The method according to claim 15, additionally comprising:
   calculating the concentration of the surfactant to be adsorbed from the second fluid during the introducing of the second fluid into the treatment zone; and
   calculating the concentration of the surfactant to be adsorbed from the third fluid during the introducing of the third fluid into the treatment zone;
   the first concentration and the second concentration are selected to minimize the total amount of the surfactant introduced into the treatment zone.

17. The method according to claim 15, wherein the third fluid is essentially the same as the second fluid except for the concentration of the surfactant.

\* \* \* \* \*